United States Patent
Kim et al.

(10) Patent No.: US 9,413,190 B2
(45) Date of Patent: Aug. 9, 2016

(54) MOBILE TERMINAL AND WIRELESS CHARGING MODULE THEREFOR

(75) Inventors: Youngtae Kim, Seoul (KR); Kiwon Han, Gyeonggi-Do (KR); Kabsung Chong, Seoul (KR); Mizi Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 594 days.

(21) Appl. No.: 13/599,068

(22) Filed: Aug. 30, 2012

(65) Prior Publication Data
US 2013/0221910 A1 Aug. 29, 2013

(30) Foreign Application Priority Data

Feb. 23, 2012 (KR) .................. 10-2012-0018670

(51) Int. Cl.
*H02J 7/00* (2006.01)
*H02J 7/02* (2016.01)
*H02J 5/00* (2016.01)
*H04B 5/00* (2006.01)

(52) U.S. Cl.
CPC .............. *H02J 7/025* (2013.01); *H02J 5/005* (2013.01); *H04B 5/0037* (2013.01); *H04B 5/0081* (2013.01)

(58) Field of Classification Search
CPC ........................................... H02J 7/025
USPC ............................. 320/108; 307/104
See application file for complete search history.

(56) References Cited

U.S. PATENT DOCUMENTS

| 2009/0058358 | A1 | 3/2009 | Inoue et al. | |
| 2009/0121677 | A1* | 5/2009 | Inoue et al. | 320/108 |
| 2010/0253153 | A1 | 10/2010 | Kondo et al. | |
| 2011/0050164 | A1 | 3/2011 | Partovi et al. | |
| 2011/0078092 | A1* | 3/2011 | Kim et al. | 705/412 |
| 2013/0117552 | A1 | 5/2013 | Kim | |

FOREIGN PATENT DOCUMENTS

| CN | 101447683 A | 6/2009 |
| WO | WO 2007/122788 A1 | 11/2007 |
| WO | WO 2011/162497 A2 | 12/2011 |

\* cited by examiner

*Primary Examiner* — Drew A Dunn
*Assistant Examiner* — Zixuan Zhou
(74) *Attorney, Agent, or Firm* — Birch, Stewart, Kolasch & Birch, LLP

(57) ABSTRACT

The present invention provides a mobile terminal which, when wireless (contactless) charging of a battery is performed by approximating a transmission coil of a charging unit (charging pad) and a reception coil provided in a wireless charging module of a mobile terminal, can adjust the saturation magnetic flux density and eddy currents of a shield sheet to which the reception coil is attached, the shield sheet being provided in the wireless charging module. When the reception coil is placed on the shield sheet to perform wireless charging, the saturation magnetic flux density and eddy current generation in the shield sheet are adjusted for wireless charging purpose because a part of the region in which the magnetic flux density is most quickly saturated was clipped off from the shield sheet. Thus, charging efficiency can be increased, and the problem of heat generation of the shield sheet can be effectively.

9 Claims, 10 Drawing Sheets

MOBILE TERMINAL AND WIRELESS CHARGING MODULE THEREFOR

CROSS-REFERENCE TO RELATED APPLICATION

Pursuant to 35 U.S.C. §119(a), this application claims the benefit of earlier filing date and right of priority to Korean Application No. 10-2012-0018670, filed on Feb. 23, 2012, the contents of which is incorporated by reference herein in its entirety.

BACKGROUND OF THE INVENTION

1. Field of the Invention

The present disclosure relates to a mobile terminal which can improve wireless charging efficiency and reduce heat generation by adjusting the saturation magnetic flux density and eddy currents of a shield sheet, and particularly, to a wireless charging module therefor.

2. Background of the Invention

Recently, mobile terminals allowing users to receive broadcast or multicast signals to view video or television programs have created the demand for higher-capacity batteries. However, batteries having a satisfactory level of capacity have not been developed yet despite continuing research. As a result, unless a charging operation is performed by determining a proper charging time and method based on a residual battery amount, mobile terminals may often fail to allow user to view video or television programs.

Accordingly, a variety of charging apparatuses and methods for making it easy to charge a battery of a mobile terminal are being developed.

In general, in order to charge a battery, there is a need for a charging unit (or charging body or charging apparatus) connected to a general power source to supply electric energy to a battery of a mobile terminal. Separate contact terminals are respectively provided to outsides of the charging unit and the battery so that the battery can be charged by connecting both contact terminals.

However, the contact terminals provided to outsides of the charging unit and the battery are not desirable in terms of appearance. Moreover, if they are exposed to moisture, the charged energy may be lost, and a charging operation may not be properly performed due to an inferior contact status. Further, the user needs to always carry the charging unit in order to charge the battery.

Therefore, to solve the above-mentioned problems, there has been developed a method that allows easy charging in a wireless (or contactless) manner without including separate contact terminals respectively in the charging unit and the battery, which is used in some fields of applications.

Known examples of the conventional non-contact charging method include a wireless charging method using inductive coupling and a wireless charging method using capacity coupling. Of the two methods, the wireless charging method using inductive coupling is a method in which a charging unit (e.g., charging pad) is equipped with a primary coil (transmission coil) and a charging target such as a terminal is equipped with a secondary coil (reception coil), and a current generated by the inductive coupling between the primary and secondary coils when the terminal approaches the charging unit is converted into energy to charge a battery.

The secondary coil has an elliptical shape and is provided on the rear surface of the mobile terminal, i.e., on the inside of a battery case, a rectangular-shaped shield sheet for shielding a magnetic flux generated by the secondary coil by electromagnetic induction is positioned under the secondary coil, and a battery cover is placed on top of the secondary coil. That is, if the battery cover is closed, the shield sheet, the secondary coil, and the battery cover are arranged in order from the inside to the outside.

In the non-contact charging method using inductive coupling, however, the secondary coil causes a magnetic flux density to quickly reach a saturated state in the case of wireless charging because the shield sheet is formed in a simple rectangular shape, and the magnetic flux generates eddy currents in the shield sheet to disturb a change in magnetic field.

Therefore, unsaturated magnetic fields of the secondary coil (reception coil) are all lost after the magnetic flux density reaches the saturated state, whereby wireless charging efficiency is reduced, and the temperature of the shield sheet rises due to the eddy currents.

SUMMARY OF THE INVENTION

Therefore, an aspect of the detailed description is to provide a mobile terminal which can increase charging efficiency and reduce heat generation in the case of wireless charging using inductive coupling and a wireless charging module therefor.

Another aspect of the detailed description is to provide a mobile terminal which can reduce heat generation caused by eddy currents in the case of wireless charging using inductive coupling and a wireless charging module therefor.

To achieve these and other advantages and in accordance with the purpose of this specification, as embodied and broadly described herein, a mobile terminal according to an embodiment of the present invention includes: a terminal body configured to allow a touch input; a display unit for displaying a saturated state of a battery; a wireless charging module that comprises a reception coil and a shield sheet, a part of which is clipped off based on saturation magnetic flux density distribution, and charges the battery by induction currents generated by electromagnetic induction between a transmission coil of a charging unit and the reception coil in the case of wireless charging; and a controller for controlling a charging operation of the wireless charging module.

The clipped region comprises a region in which the magnetic flux density is most quickly saturated when wireless charging is performed because the reception coil is placed on the shield sheet and a portion through which coil lines of the reception coil pass.

The size and shape of the clipped region is determined by the size, shape, material, number of turns, and resistance value of the reception coil and the distribution of a saturation magnetic density generated by the reception coil.

The regions of the shield sheet other than the clipped region are regularly cut outward from the center of the shield sheet, and the cut regions are not connected to the clipped region at the center portion.

The shield sheet is any one of a shield sheet from which a first region comprising the center is clipped off, a shield sheet from which a second region not comprising the center is clipped off, and a shield sheet diagonally cut at the regions other than the second region.

The shapes of the first and second regions comprise a circular shape, an elliptical shape, and a polygonal shape corresponding to the shape of the reception coil, and the second region is discontinuously clipped off.

The wireless charging module in the mobile terminal includes: a charging receiver module that generates induction currents by electromagnetic induction between the transmission coil and the reception coil in the case of contactless charging; a battery that charges the induction currents generated from the charging receiver module; and a wireless charging circuit that controls wireless charging of the battery under control of a controller between the charging receiver module and the battery.

To achieve these and other advantages and in accordance with the purpose of this specification, as embodied and broadly described herein, a wireless charging module according to an embodiment of the present invention includes: a battery for charging induction currents; a wireless charging module that comprises a reception coil and a shield sheet, a part of which is clipped off based on saturation magnetic flux density distribution, and charges the battery by induction currents generated by electromagnetic induction between a transmission coil of a charging unit and the reception coil in the case of wireless charging; and a wireless charging circuit that controls wireless charging of the battery between the charging receiver module and the battery.

The clipped region comprises a region in which the magnetic flux density is most quickly saturated when wireless charging is performed because the reception coil is placed on the shield sheet and a portion through which coil lines of the reception coil pass.

The size and shape of the clipped region is determined by the size, shape, material, number of turns, and resistance value of the reception coil and the distribution of a saturation magnetic density generated by the reception coil.

The regions of the shield sheet other than the clipped region are regularly cut outward from the center of the shield sheet, and the cut regions are not connected to the clipped region at the center portion.

The shield sheet is any one of a shield sheet from which a first region comprising the center is clipped off, a shield sheet from which a second region not comprising the center is clipped off, and a shield sheet diagonally cut at the regions other than the second region. The shapes of the first and second regions comprise a circular shape, an elliptical shape, and a polygonal shape corresponding to the shape of the reception coil, and the second region is discontinuously clipped off.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

A terminal may be implemented in various types. For instance, the terminal in the present description includes a mobile terminal such as a portable phone, a smart phone, a notebook computer, a digital broadcasting terminal, Personal Digital Assistants (PDA), Portable Multimedia Player (PMP), a navigation system, and a fixed terminal such as a digital TV, a desktop computer, etc. It is assumed that the terminal of the present invention is a mobile terminal. However, it will be obvious to those skilled in the art that the present invention may be also applicable to the fixed terminal, except for specific configurations for mobility.

Figure 1:
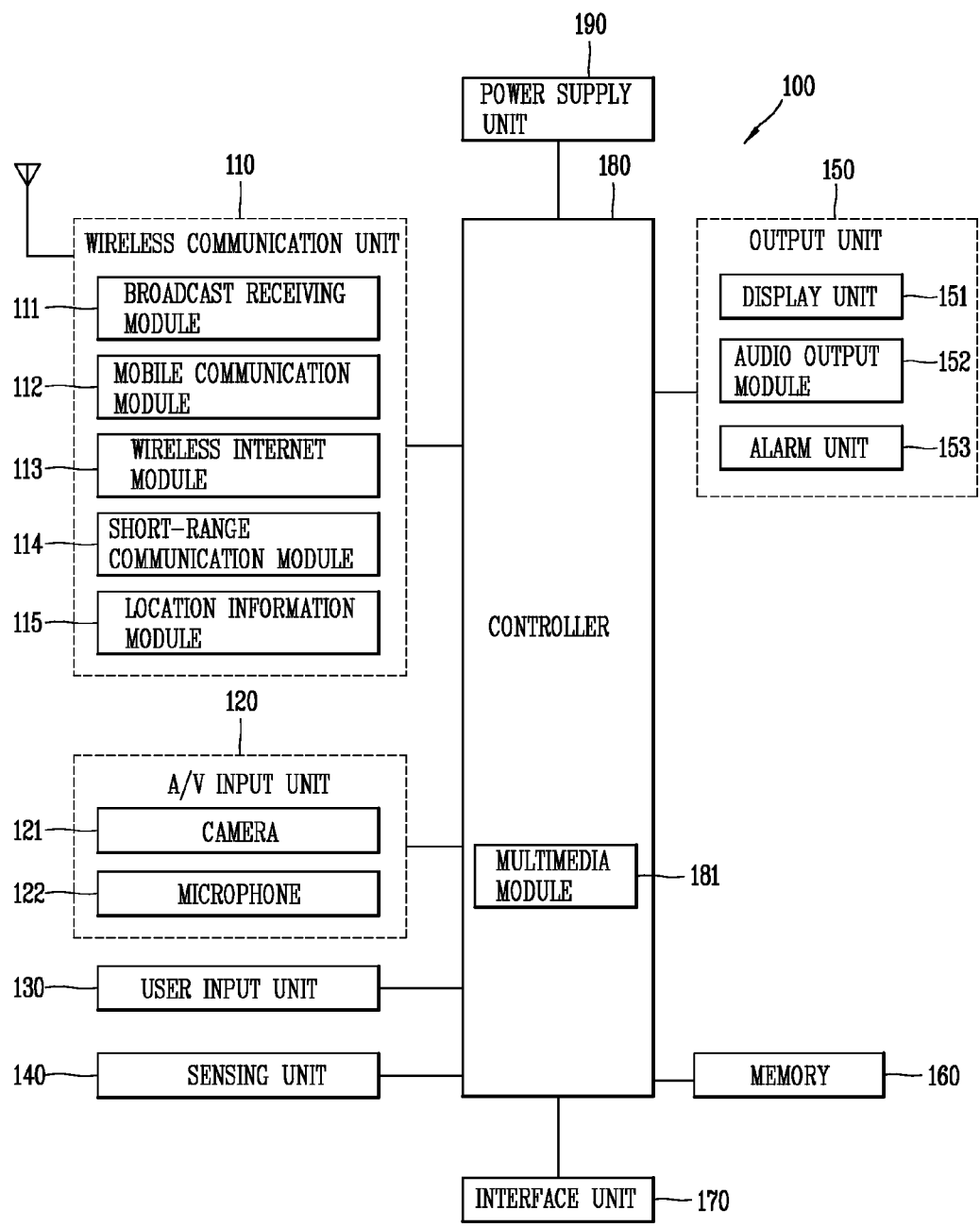
FIG. 1 is a block diagram of a mobile terminal associated with an embodiment of the present invention.

FIG. 1 is a block diagram of a mobile terminal according to an embodiment of the present invention.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal. For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore the GPS module may acquire speed information by real time calculating a current position.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The sensing unit 140 includes a geomagnetic sensor configured to calculate a moving direction when a user moves, a gyro sensor configured to calculate a rotation direction, and an acceleration sensor.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

Here, the identification module may be a memory chip that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may operate as signals for recognizing when the mobile terminal is properly mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit (not shown) and an internal display unit (not shown). The touch screen may be configured to detect a touch input pressure as well as a touch input location and a touch input area.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 153. Accordingly, the display unit 151 or the audio output module 152 may be classified as a part of the alarm unit 153.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The controller 180 typically controls the overall operations of the mobile terminal 100. For example, the controller 180 performs the control and processing to associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

Figure 2:
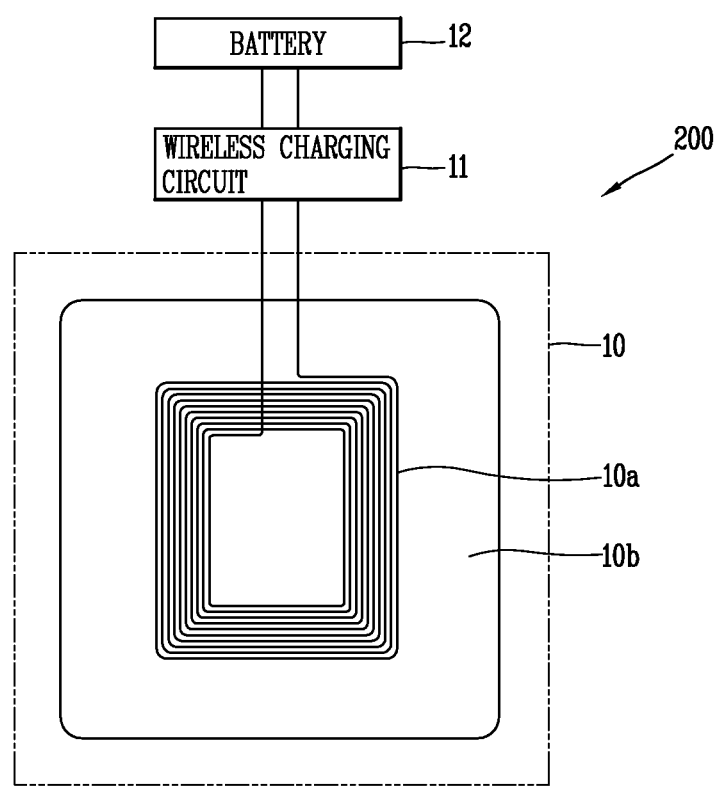
FIG. 2 is a block diagram of a typical wireless charging module.

FIG. 2 is a block diagram of a typical wireless charging module 200.

As shown therein, the wireless charging module 200 includes a charging receiver module 10 that includes a reception coil 10a and a shield sheet 10b and, in the case of wireless charging, generates induction currents by inductive coupling between the reception coil 10a and a transmission coil (primary coil) provided in a charging unit (e.g., charging pad) (not shown), a wireless charging circuit 11 that controls a wireless charging operation under control of a controller, and a battery 12 that is charged by the induction currents provided through the wireless charging circuit 11.

The charging receiver module 10 includes the reception coil (secondary coil) 10a that generates induction currents by inductive coupling with the transmission coil (primary coil) provided in the charging unit (e.g., charging pad) and the shield sheet 10b that shields electromagnetic waves generated from the reception coil 10a.

The shield sheet 10b is larger than the reception coil 10a, and the reception coil 10a is attached onto the shield sheet 10b and covered with a battery cover (not shown).

Figure 3:
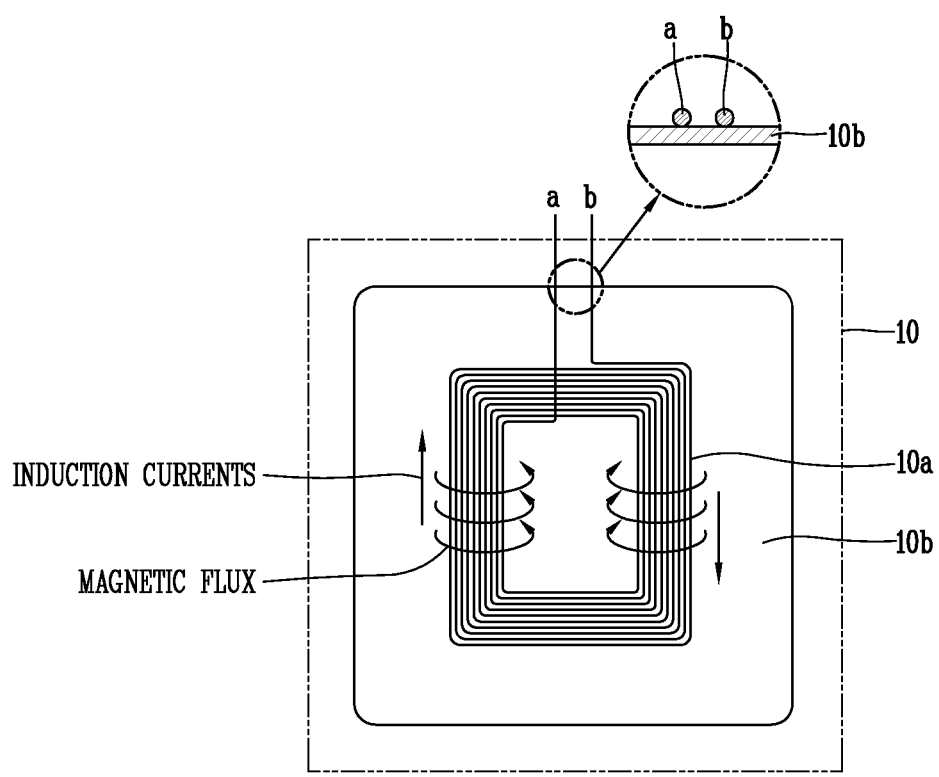
FIG. 3 is a view showing induction currents and magnetic flux changes which are generated in a charging receiver module in the case of wireless charging.

FIG. 3 is a view showing induction currents and magnetic flux changes which are generated in the charging receiver module 10 in the case of wireless charging.

As shown in FIG. 3, when a mobile terminal is placed on a charging pad, a magnetic field is generated by inductive coupling between the transmission coil (not shown) and reception coil 10a of the charging pad to cause induction currents to flow through the reception coil 10a. At this point, when the reception coil is placed at a center portion of the shield sheet 50a, the magnetic flux density of a region of the shield sheet corresponding to the inside of the reception coil increases, and hence the magnetic flux density of the shield sheet 50a where the reception coil 10a is placed also quickly reaches a saturated state.

If the magnetic flux density quickly reaches a saturated state, this means that the magnetic flux quickly approaches a maximum value, which implies that there is less room for absorbing magnetic flux.

Therefore, unsaturated magnetic fields are all lost after the magnetic flux density reaches the saturated state, thereby causing a reduction in wireless charging efficiency and, especially, an increase in heat generation caused by the magnetic field loss.

Moreover, when the magnetic flux caused by the magnetic field passes through the shield sheet 10b, currents disturbing a change in magnetic field, that is, eddy currents, are generated. The eddy currents increase in proportion to the intensity and area of a magnetic field, and cause a temperature rise in the shield sheet 50b.

Further, the reception coil 10a of the charging receiver module 10 is connected to the wireless charging circuit 11 through coil lines a and b. At this point, the coil lines a and b pass through the shield sheet 10b. Thus, the thickness of the coil lines is added to the thickness of the shield sheet 10b, thus increasing the overall thickness.

As such, the typical wireless charging module 200 experiences a charging efficiency drop due to a saturation magnetic flux density in the case of wireless charging, and, particularly, the heat generation of the shield sheet 10b caused by eddy currents is emerging as the biggest problem.

Accordingly, in order to solve the problems occurring in the typical wireless charging module, the present invention suggests a method which is capable of improving wireless charging efficiency and eliminating the problem of heat generation caused by eddy currents in the case of wireless charging because a region in which the magnetic flux density is most quickly saturated or a part of the region was clipped off from the shield sheet based on reception coil dimensions and saturation magnetic flux density distribution.

The present invention provides a shield sheet, a part of which is clipped off based on saturation magnetic flux density distribution in order to facilitate the adjustment of saturation magnetic flux density and reduce eddy currents, rather than providing a shield sheet according to the conventional art having a simple rectangular shape.

Provided that a shield sheet material has a rectangular shape, a portion to be clipped off from the shield sheet material includes a region corresponding to the inside of the reception coil when the reception coil is placed on the shield sheet, that is, a center portion of the shield sheet and its periphery where a magnetic flux density is quickly saturated. In order to reduce the thickness, a portion through which the coil lines of the reception coil pass is additionally clipped off.

The clipping amount and shape are variably determined by the size, shape, material, number of turns, resistance value, and other quality factors of the reception coil and the distribution of a saturation magnetic density. Especially, the clipping shape can be modified in various ways according to the shape of the reception coil. The clipping shape, for example, can include a circular shape, an elliptical shape, and other various polygonal shapes.

For instance, if two reception coils have different numbers of turns, a larger magnetic flux is generated in the reception coil with more turns even though they have the same size, shape, material, and resistance value. Therefore, to use the reception coil with more turns, the region to be clipped off from the shield sheet needs to be larger.

In another embodiment, the clipping shape may be different from the shape of the reception coil.

The center portion of the shield sheet and the portion through which the coil lines pass are connected to each other, and the regions of the shield sheet other than the clipped region are cut outward from the center of the shield sheet. At this point, the other regions are not connected to the clipped region, and are cut at regular intervals.

Accordingly, if the reception coil is attached onto the shield sheet to form a wireless charging module, the center portion of the shield sheet and the upper portion through which the coil lines pass are perforated.

FIGS. 4A to 4D are a variety of embodiments of a clipped shield sheet.

Figure 4A:
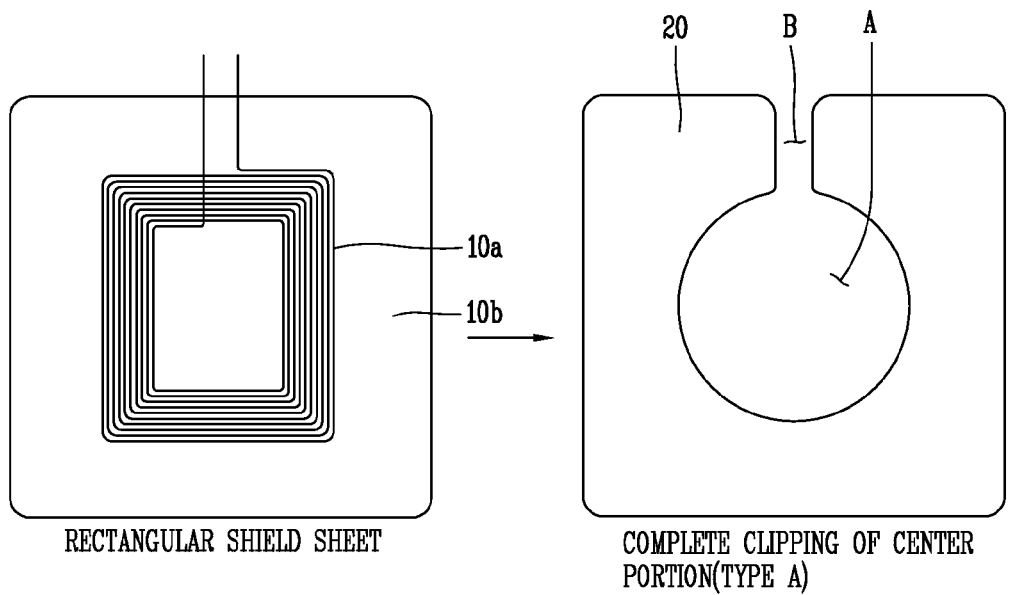
FIGS. 4A to 4D are a variety of embodiments of a clipped shield sheet according to the present invention.

FIG. 4A depicts a new shield sheet 20 (type A), which is formed by clipping off a region A, formed by an ellipsoid (or circle) with respect to the center of a rectangular shield sheet 10b, and a region B, through which the coil lines pass, in accordance with the dimensions of the reception coil and the distribution of a magnetic flux density.

The clipped region A has an elliptical shape, for example, if the reception coil 10a has an elliptical shape, and is smaller than the entire reception coil 10a. That is, the clipped region A is clipped off in a proper size (when viewed from the rear) so that a part of the reception coil 10a is exposed through the clipped region when the reception coil 10a is attached on the shield sheet 20. At this point, the clipped regions A and B are connected to each other.

The shield sheet 20 shown in FIG. 4A has such a shape that a region including the center is completely clipped off. Therefore, the magnetic flux density decreases near the center in the case of wireless charging. As a result, the magnetic flux density of the shield sheet 20 does not reach a saturation state, thereby increasing wireless charging efficiency.

Figure 4B:
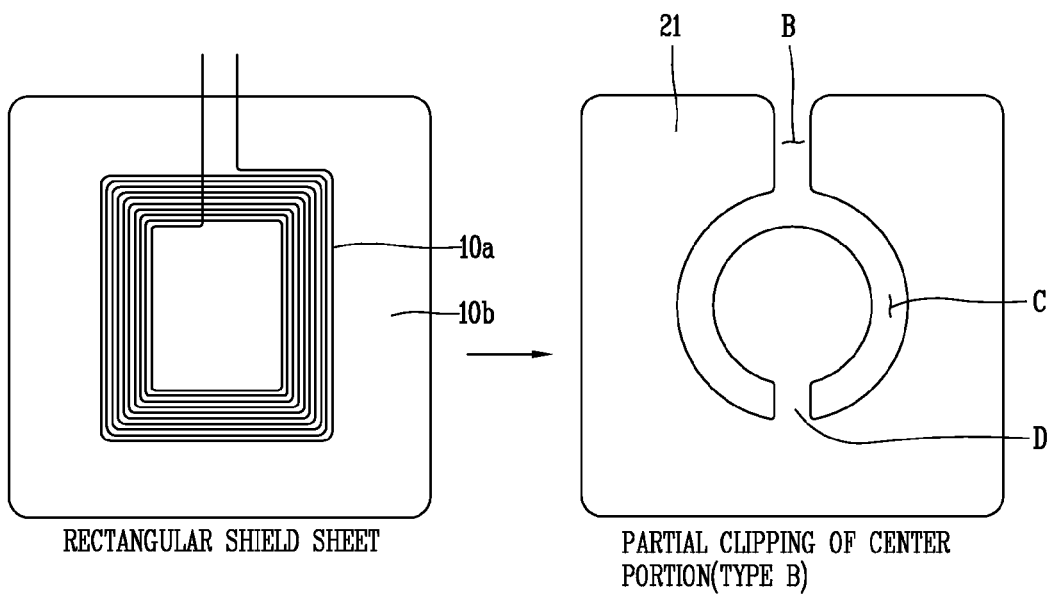

FIG. 4B depicts a new shield sheet 21 (type B), which is formed by clipping off a region C, formed by two ellipsoids (or circles) having different diameters with respect to the center of a rectangular shield sheet 10b, and a region B, through which the coil lines pass, in accordance with the shape of the reception coil 10a.

That is, the shield sheet of type B has such a shape that a region not including the center is clipped off. At this point, the region C is not completely clipped off, but is discontinuously clipped off so that the remaining center portion (the portion including the center) is connected to the shield sheet 21. The discontinuous region D may be formed at, but not limited to, the bottom, and may be formed at the top, left, or right. Moreover, at least one discontinuous region D may be formed.

The shield sheet 21 shown in FIG. 4B has such a shape that the center portion remains and the periphery thereof is partially clipped off. Therefore, the magnetic flux density is saturated near the center in the case of wireless charging, but the portion where the coils are placed is not saturated, thereby increasing wireless charging efficiency.

Figure 4C:
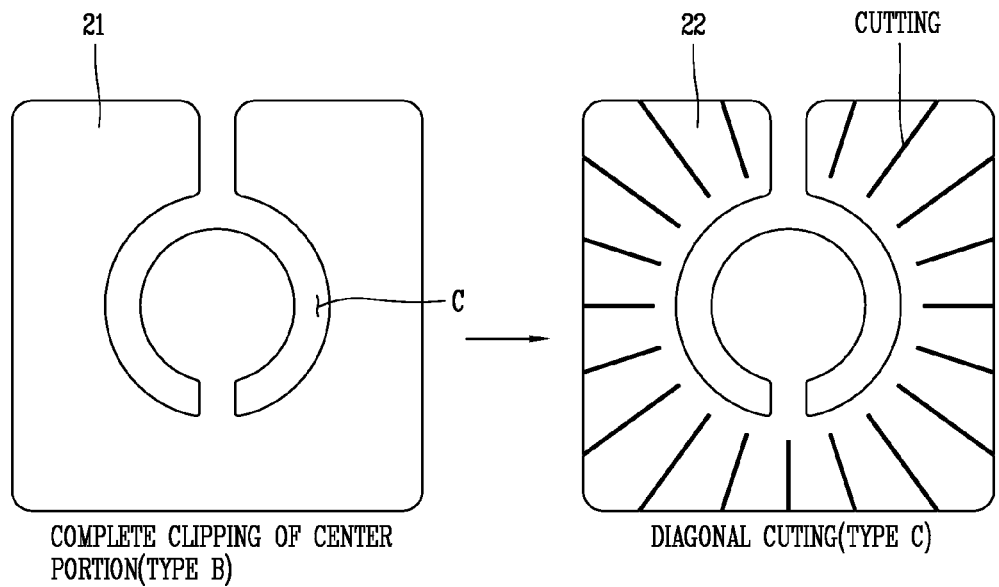

FIG. 4C depicts a shield sheet 22 (type C), which is formed by diagonally cutting the unclipped portion toward the clipped region C on the shield sheet 21 shown in FIG. 4B. At this point, the width, number, and intervals of cuts can be set by the user.

Although the performance of the shield sheet 22 (type C) is similar to the performance of the shield sheet 21 (type B), it has flaws or cuts, which are not formed in the shield sheet 21. Thus, the eddy current generation area is decreased, and this causes less heat generation.

Figure 4D:
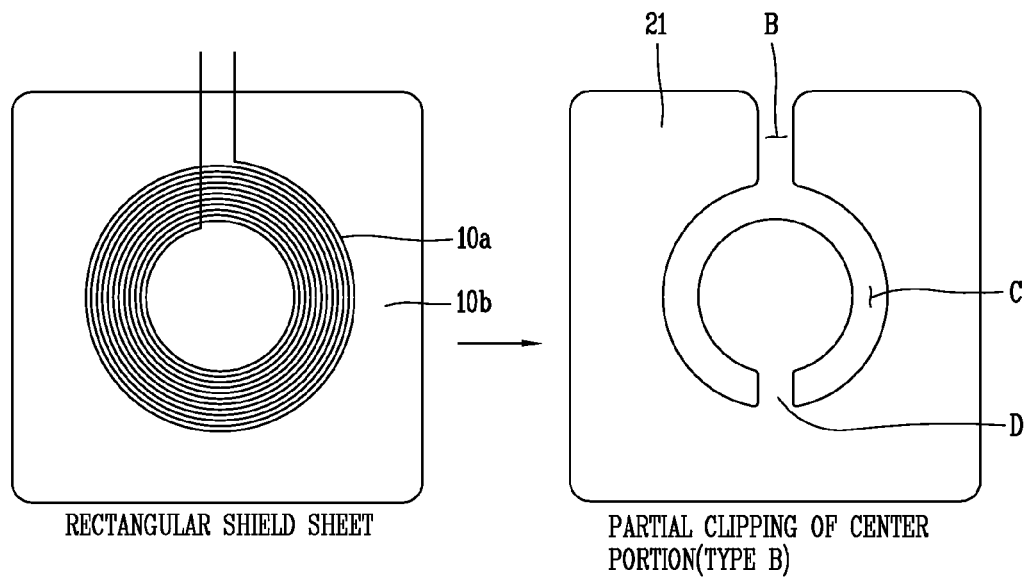

FIGS. 4A to 4C depict the shield sheet 21 clipped off in a circular shape with respect to the elliptical reception coil 10*a*, but the present invention is not limited thereto and the reception coil 10*a* and the shield sheet 21 may have the same shape as shown in FIG. 4D, that is, the shield sheet 21 may be clipped off in a circular shape with respect to the circular reception coil 10*a*.

Figure 5:
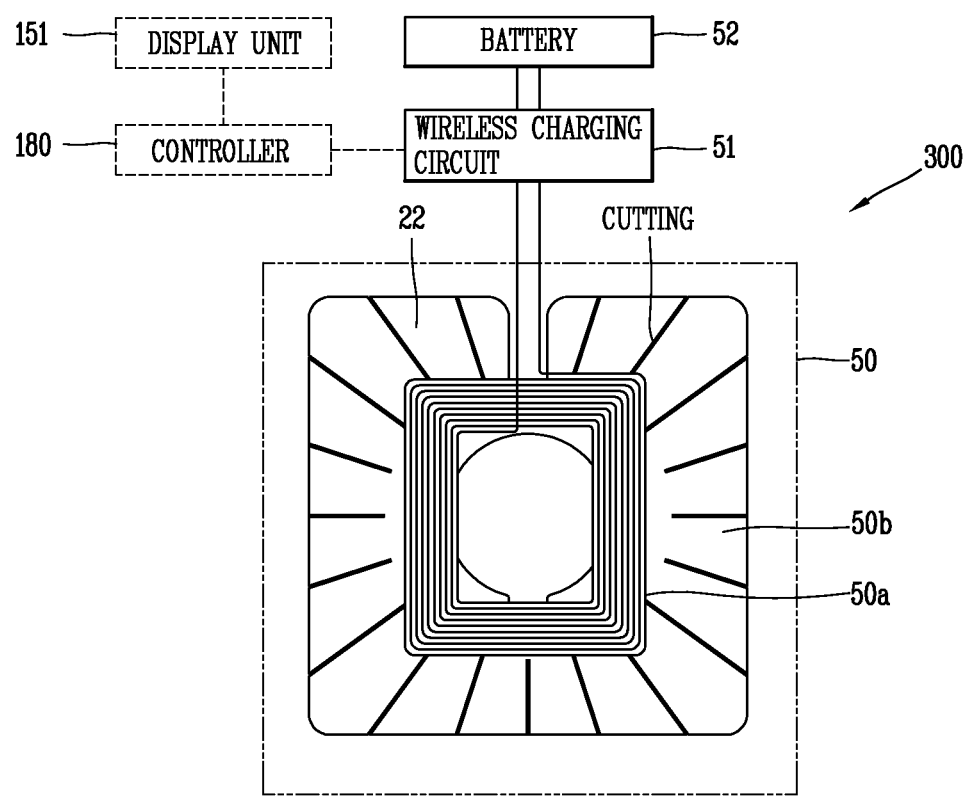
FIG. 5 is a block diagram of a wireless charging module including a shield sheet according to an embodiment of the present invention.

FIG. 5 is a block diagram of a wireless charging module 300 including a shield sheet according to an embodiment of the present invention. The wireless charging module 300 shown in FIG. 5 has the same components as FIG. 3, except to for a charging receiver module 50, though different reference numerals are used.

As shown in FIG. 5, the charging receiver module 50 includes a reception coil 50*a* that, in the case of wireless charging, generates induction currents by inductive coupling with a transmission coil (primary coil) provided in a charging unit (e.g., charging pad) and a shield sheet 50*b* that shields electromagnetic waves generated from the reception coil 50*a* when the reception coil 50*a* is placed, with the center portion being clipped off in a predetermined shape based on saturation magnetic density distribution. The shield sheet 50*b* is one of the types A through C shown in FIGS. 4*a* through 4*c*. FIG. 5 illustrates an example of the shield sheet 50*b* of type C.

The induction currents generated from the charging receiver module 50 is charged in a battery 52 through a wireless charging circuit 51. The battery 52 corresponds to the power supply unit 190 of FIG. 1.

The wireless charging circuit 51 detects a charged state of the battery under control of the controller 180 to control a wireless charging operation, and the detected charged state of the battery 52 is displayed on the display unit 151 through the controller 180.

If the shield sheet 50*b* is used to constitute the charging receiver module 50, the saturation magnetic flux density of the shield sheet 50*b* is adjusted in accordance with a cutting position and shape. Accordingly, when induction currents are generated by inductive coupling between the transmission coil (primary coil) provided in the charging unit (e.g., charging pad) and the reception coil, it may be further absorbed into the shield sheet 50*b* of a magnetic flux generated by electromagnetic induction. Consequently, the penetration of the coils of the magnetic flux becomes deeper, compared to the conventional art, and this leads to an increase in wireless charging efficiency on the whole.

Moreover, if the shield sheet 50*b* is used to constitute the charging receiver module 50, eddy currents generated in the shield sheet 50*b* decrease in accordance with a cutting position and shape, thereby reducing heat generation, compared to the conventional art.

Figure 6:
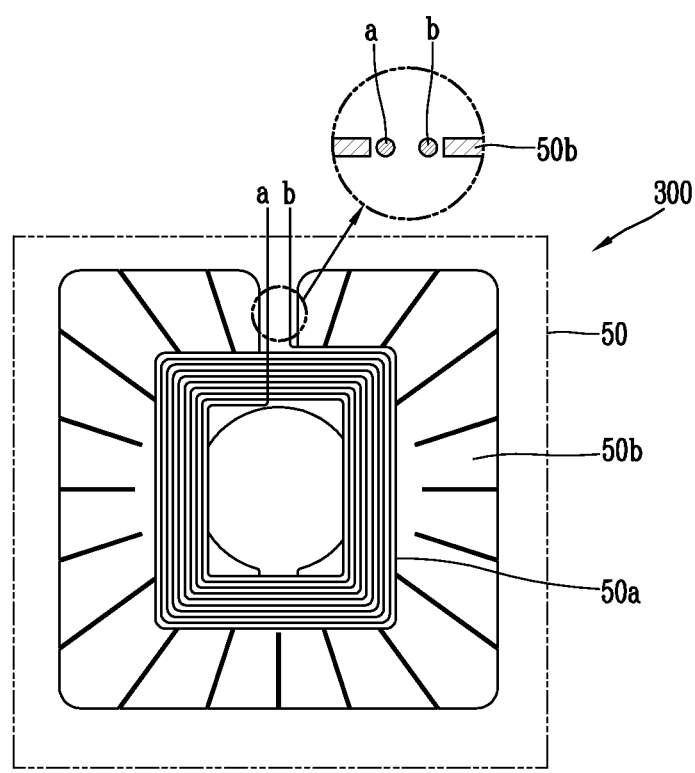
FIG. 6 is a view showing the arrangement positions of coil lines of a reception coil when a shield sheet is used to constitute a charging receiver module according to the present invention.

FIG. 6 is a view showing the arrangement positions of the coil lines a and b of the reception coil 50*a* when the shield sheet 50*b* is used to constitute the charging receiver module 50.

As shown in FIG. 6, the reception coil 50*a* is attached onto the shield sheet 50*b* when used to constitute the charging receiver module 50. At this point, the coil lines a and b of the reception coil 50*a* are placed within the clipped region B, so the thickness of the coil lines a and b can be eliminated.

Figure 7:
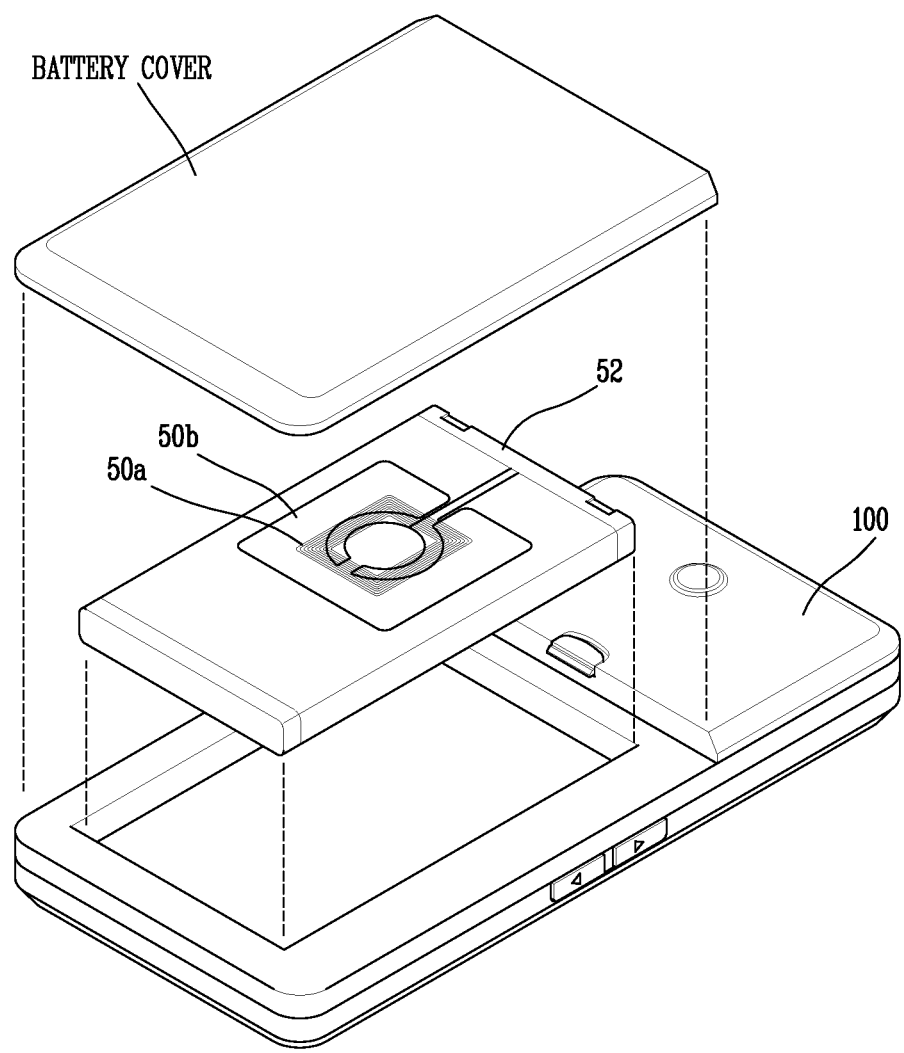
FIG. 7 is a view showing an example of coupling of a charging receiver module to a mobile terminal.

FIG. 7 is a view showing an example of coupling of a charging receiver module to a mobile terminal.

As shown in FIG. 7, the charging receiver module 50 according to the present invention is connected to the battery 52 through the wireless charging unit 51 positioned on the rear surface of the mobile terminal. An input end of the wireless charging circuit 51 is connected to the coil lines a and b of the reception coil 50*a*, and an output end thereof is coupled to the battery 52. The wireless charging circuit 51 has a charging control function for controlling charging or discharging by detecting the state of the battery 52 under control of the controller 180.

Accordingly, when the charging receiver module 50 is connected to the wireless charging circuit 51, a battery cover is placed on top of the charging receiver module 50. When the mobile terminal is placed on the charging unit (e.g., charging pad) for wireless charging, with the battery covered closed, wireless charging is performed.

Figure 8:
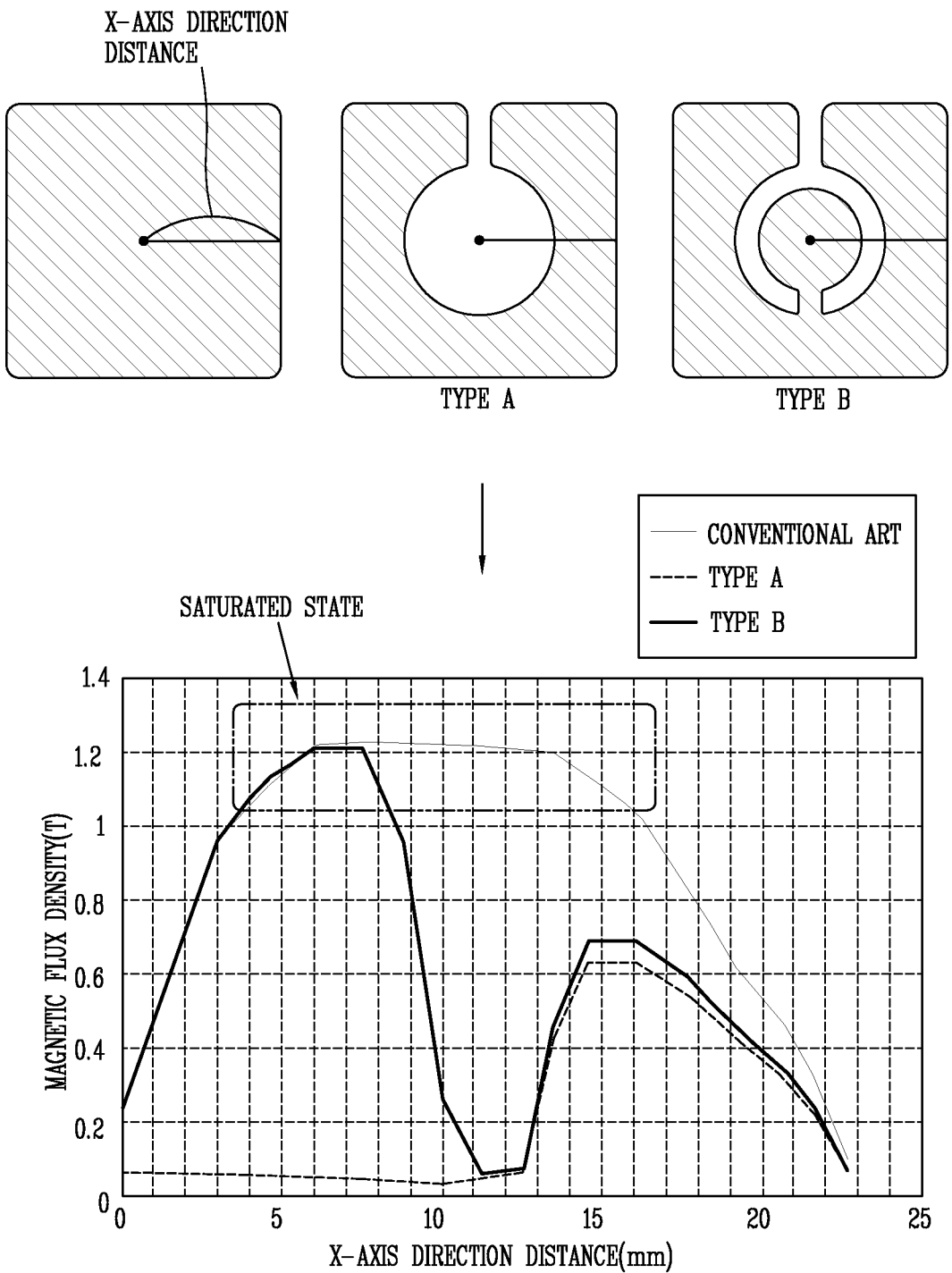
FIG. 8 is a graph showing the distribution of magnetic flux density of a shield sheet according to shield sheet types.
Figure 9:
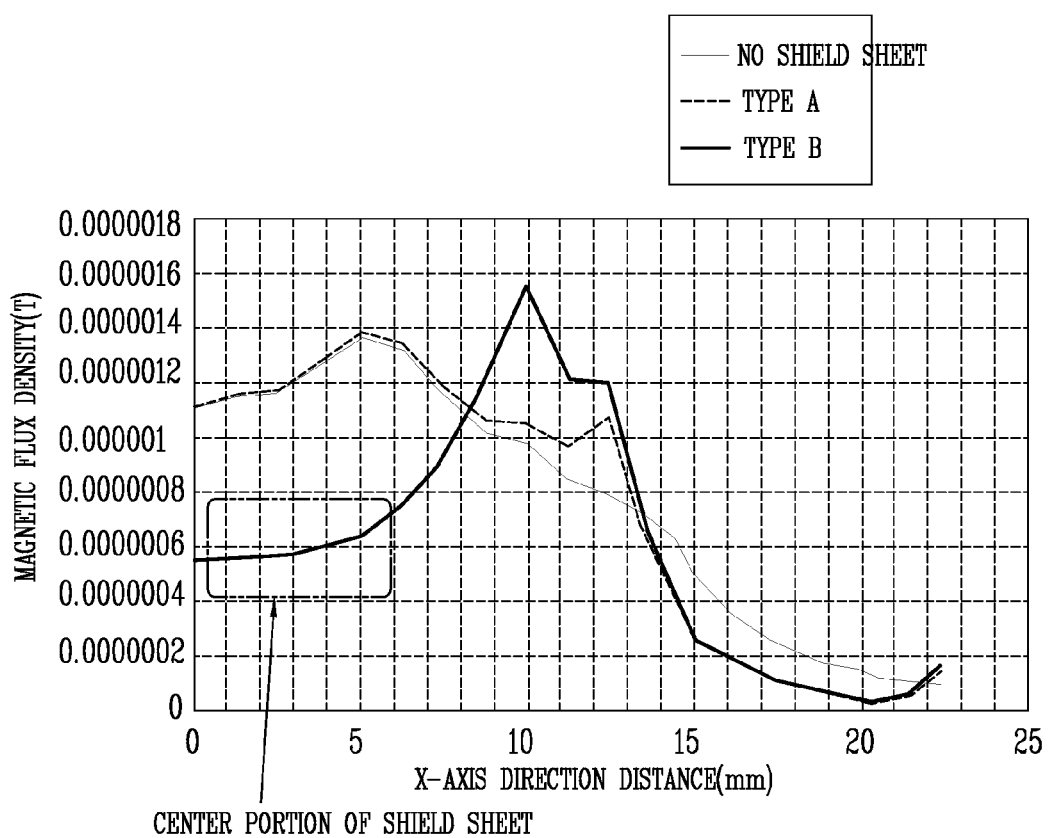
FIG. 9 is a graph showing the distribution of shielding effect according to shield sheet types.

FIGS. 8 and 9 are graphs showing simulation results for shield sheet types when the charging receiver module 50 is configured to perform wireless charging. FIG. 8 is a graph showing the distribution of magnetic flux density of a shield sheet according to shield sheet types.

As shown in FIG. 8, if a conventional rectangular shield sheet is used to constitute the charging receiver module 50, the magnetic flux density of a portion extending from the center of the shield sheet to a coil placement part gets saturated (about 1.2 T) during actual wireless charging. As a result, it can be seen that the wireless charging efficiency is lowered, and eddy currents are generated, thereby increasing heat generation.

On the other hand, if the shield sheet of type A of the present invention is used to constitute the charging receiver module 50, the magnetic flux density is quite low (about 0.1 T) during actual wireless charging because the center portion of the shield sheet was clipped off, and the magnetic flux density increases toward the outside to reach about 0.63 T. Further, if the shield sheet of type B of the present invention is used to constitute the charging receiver module 50, the magnetic flux density is saturated (about 1.2 T) during actual wireless charging because the center portion of the shield sheet was not clipped off, and the magnetic flux density is abruptly lowered due to the clipped region and increases again toward the outside to reach about 0.6 T. That is, the saturation of the shield sheet at the reception coil portion was lowered by about 50% compared to the conventional art.

FIG. 9 is a graph showing the distribution of shielding effect according to shield sheet types.

As shown in FIG. 9, the intensity T of a magnetic field obtained when no shield sheet is used is almost similar to the intensity T of a magnetic field obtained when the shield sheet of type A of the present invention. However, the intensity T of a magnetic field at the center obtained when the shield sheet of type B of the present invention is used becomes lower than those obtained when the shield sheets of the conventional art and type A are used, whereby it can be seen that the shielding effect is improved. Accordingly, in the case that the shield sheet of type B or C of the present invention is used to constitute the charging receiver module 50, charging efficiency can be increased, and the problem of heat generation caused by eddy currents can be effectively solved without lowering the shielding effect.

As described above, the present invention can improve wireless charging efficiency and eliminate the problem of heat generation of a shield sheet, because a region in which the magnetic flux density is most quickly saturated or a part of the region was clipped off from the shield sheet based on a magnetic flux density distribution when configuring a wireless charging module, and the saturation magnetic flux density distribution of the shield sheet and the generation of eddy currents are adjusted when performing wireless charging by induction currents generated by electromagnetic induction between a transmission coil of a charging unit and a reception coil of the wireless charging module.

According to an embodiment disclosed in this specification, the above-described method can be implemented as a computer readable code on a medium recording a program. The computer readable medium includes all kinds of storage devices for storing data readable by a computer system. Examples of the computer readable medium include ROM, RAM, CD-ROMs, magnetic tapes, floppy disks, optical data storage devices, and so on, and may also be implemented in the form of carrier waves, such as transmission over the Internet. The computer may include a controller of a terminal.

As described above, the above-described mobile terminal is not limited to the configuration and method of the embodiments described as above, but the embodiments may be configured by selectively combining all the embodiments or some of the embodiments so that various modifications can be made.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a terminal body configured to allow a touch input;
a display unit for displaying a charged state of a battery;
a wireless charging module that comprises a reception coil and a shield sheet, a part of which is clipped off based on saturation magnetic flux density distribution, and is configured to charge the battery by induction current generated by electromagnetic induction between a transmission coil of a charging unit and the reception coil in the case of wireless charging; and
a controller configured to control a charging operation of the wireless charging module,
wherein the reception coil is a winding type coil including a center hole of a predetermined size,
wherein the shield sheet is not clipped at a first region corresponding to the central hole of the receiving coil and a second region that is clipped, the second region being where the receiving coil is positioned, and
wherein an outer region of the clipped second region has diagonally cuts extending outwardly from the clipped second region at regular intervals, the diagonal cuts regions not connected to the clipped second region, and
wherein the first region is partially connected to the outer region.

2. The mobile terminal of claim 1, wherein the first region comprises a region in which the magnetic flux density is most quickly saturated when wireless charging is performed.

3. The mobile terminal of claim 1, wherein the size and shape of the first region or clipped second region is determined by the size, shape, material, number of turns, and resistance value of the reception coil and the distribution of a saturation magnetic density generated by the reception coil.

4. The mobile terminal of claim 1, wherein the shapes of the first and second regions comprise a circular shape, an elliptical shape, and a polygonal shape corresponding to the shape of the reception coil, and the second region is discontinuously clipped off.

5. The mobile terminal of claim 1, wherein the wireless charging module comprises:
a charging receiver module that generates induction current by electromagnetic induction between the transmission coil and the reception coil in the case of contactless charging;
a battery that charges the induction current generated from the charging receiver module; and
a wireless charging circuit that controls wireless charging of the battery under control of a controller between the charging receiver module and the battery.

6. A wireless charging module of a mobile terminal comprising:
a reception coil having a winding type coil including a center hole of a predetermined size;
a battery configured to charge an induction current generated by electromagnetic induction when between the reception coil and a transmission coil of a charging unit;
a shield sheet positioned on the reception coil and configured to shield a magnetic flux generated from the reception coil by the electromagnetic induction; and
a wireless charging circuit configured to control wireless charging of the battery,
wherein the shield sheet is not clipped at a first region corresponding to the central hole of the receiving coil and a second region that is clipped, the second region being where the receiving coil is positioned, and
wherein an outer region of the clipped second region has diagonally cuts extending outwardly from the clipped second region at regular intervals, the diagonal cuts regions not connected to the clipped second region, and
wherein the first region is partially connected to the outer region.

7. The wireless charging module of claim 6, wherein the first region comprises a region in which the magnetic flux density is most quickly saturated when wireless charging is performed.

8. The wireless charging module of claim 6, wherein the size and shape of the first region or clipped second region is determined by the size, shape, material, number of turns, and resistance value of the reception coil and the distribution of a saturation magnetic density generated by the reception coil.

9. The wireless charging module of claim 6, wherein the shapes of the first and second regions comprise a circular shape, an elliptical shape, and a polygonal shape corresponding to the shape of the reception coil, and the second region is discontinuously clipped off.

* * * * *